United States Patent
Subramanian et al.

(10) Patent No.: US 7,195,309 B1
(45) Date of Patent: Mar. 27, 2007

(54) BODYSIDE WITH INTEGRAL WHEELHOUSE STRUCTURE FOR AUTOMOTIVE VEHICLE

(75) Inventors: Saravanan Subramanian, Westland, MI (US); Raj Sohmshetty, Canton, MI (US); Jim E. DeVries, Canton, MI (US); Paul E. Geck, Commerce Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 11/164,800

(22) Filed: Dec. 6, 2005

(51) Int. Cl.
*B60R 13/01* (2006.01)
*B21D 28/26* (2006.01)

(52) U.S. Cl. .................. 296/198; 296/39.2; 72/335
(58) Field of Classification Search ............. 296/39.1, 296/39.2, 183.1, 193.05, 198; 29/897.2; 72/335
See application file for complete search history.

(56) References Cited

U.S. PATENT DOCUMENTS

| | | | |
|---|---|---|---|
| D248,386 S * | 7/1978 | Hefner | D12/221 |
| 4,279,439 A * | 7/1981 | Cantieri | 296/39.2 |
| 4,733,898 A * | 3/1988 | Williams | 296/24.32 |
| 4,890,874 A * | 1/1990 | Davis | 296/39.2 |
| 4,960,301 A * | 10/1990 | Fry et al. | 296/39.2 |
| 4,991,899 A | 2/1991 | Scott | 296/39.2 |
| 5,139,300 A * | 8/1992 | Carriere | 296/39.1 |
| 5,154,478 A * | 10/1992 | Erickson et al. | 296/39.2 |
| 6,033,002 A * | 3/2000 | Clare et al. | 296/3 |
| 6,059,343 A | 5/2000 | Emery | 296/39.2 |
| 6,128,815 A | 10/2000 | Jurica et al. | 29/417 |
| 6,142,549 A * | 11/2000 | Clare et al. | 296/37.6 |
| 6,347,454 B1 | 2/2002 | Jurica et al. | 29/897.2 |
| 6,422,642 B1 | 7/2002 | Grimm et al. | 296/181.3 |
| 6,523,877 B1 * | 2/2003 | Damian | 296/37.6 |
| 6,644,721 B1 | 11/2003 | Miskech et al. | 296/183.1 |
| 2002/0109376 A1 * | 8/2002 | Gruich | 296/183 |
| 2004/0113458 A1 | 6/2004 | Kloepfer | 296/186.1 |

* cited by examiner

*Primary Examiner*—Dennis H. Pedder
*Assistant Examiner*—Paul Chenevert
(74) *Attorney, Agent, or Firm*—Gigette M. Bejin; Artz & Artz, P.C.

(57) ABSTRACT

A bodyside for an automotive vehicle includes a folded structure having a generally horizontal floor portion and a generally vertical side portion which is unitary with the floor portion. A wheelhouse structure, which is indexed with a wheelhouse cutout of an outer panel applied to the bodyside, is formed integrally with the floor portion and the side portion by a folding process. End portions of the wheelhouse structure are closed either by closure panels or storage compartments.

10 Claims, 4 Drawing Sheets

BODYSIDE WITH INTEGRAL WHEELHOUSE STRUCTURE FOR AUTOMOTIVE VEHICLE

BACKGROUND OF THE INVENTION

The present invention relates to a bodyside assembly for an automotive vehicle in which the bodyside structure is formed not by stamping, but rather by folding a prepunched blank so that a wheelhouse structure is created integrally from the blank, along with the side and floor portions of the bodyside.

Inner side panels for pickup truck boxes are typically made through a stamping process. Because of the geometry of the wheelhouse portion of the pickup bodyside panel or structure, it is difficult to stamp the wheelhouse and remaining bodyside from high strength steel. Although low strength steel is more easily formed by a deep draw process into a bodyside panel, this type of construction has sometimes proven to be unsatisfactory in the hands of vehicle users, because of the denting occurring from everyday usage of low-strength steel pickup boxes or other vehicles.

The present invention allows a bodyside to be formed without the need for stamping or deep drawing, which allows higher strength material to be used, thereby promoting a better product and greater customer satisfaction.

SUMMARY OF THE INVENTION

A bodyside for an automotive vehicle starts with a sheet blank which is processed by folding on a plurality of axes which are parallel to a longitudinal axis of a vehicle to which the body is adapted to be attached. The sheet blank is formed by folding so as to create a body structure having a generally horizontal floor portion and a generally vertical side portion extending upper from and unitary with the floor portion. A wheelhouse structure is formed integrally with the floor portion and the side portion, with the wheelhouse structure having an inboard panel extending upwardly from the floor portion, and an upper panel extending generally horizontally between an upper portion of the inboard panel and the generally vertical side portion of the body structure. At least one closure structure encloses an end portion of the wheelhouse structure. The closure structure may include a cover panel applied to the wheelhouse structure and having: a center section overlaying the wheelhouse upper panel, a leading section extending from the front of the wheelhouse upper panel to the floor portion, and a trailing section extending from the rearmost part of the wheelhouse upper panel to the floor portion of the body structure. Alternatively, a closure structure may include a storage container extending within the wheelhouse structure, or a pair of storage containers, with a first one in a position leading the upper panel of the wheelhouse structure and a second storage container in a position trailing the upper panel of the wheelhouse structure.

According to another aspect of the present invention, a method of forming a unitary bodyside of an automotive vehicle with the bodyside having a floor portion, a side portion, and wheelhouse structure, includes the steps of preparing a blank by forming a plurality of cutouts within the blank, with the cutouts having inboard vertexes defining a first fold line extending between the floor portion and the inboard panel of the wheelhouse, and with the cut-outs having outboard vertexes defining a second fold line extending between the side portion and the upper panel of the wheelhouse. The blank is folded at a third fold line extending parallel to and between the first and second fold lines, so as to the define the floor portion and side portion of the bodyside or pickup box, while simultaneously forming the inner panel and upper panel of wheelhouse by folding the blank at the first and second fold lines, as well as upon a fourth fold line extending between the inner and upper panels of the wheelhouse. After the blank is been folded, a cover is provided for each of the cutouts formed in the blank before the blank is folded. According to the present invention, these covers may include either a storage container or panels extending from the upper portion of the wheelhouse to the floor portion of the bodyside.

It is the advantage of a method and system according to the present invention that a durable, dent resistant vehicle bodyside, suitable for use, for example, with a pickup truck, may be produced from high strength material not generally suitable for stamping, and which, according to the present process is folded, rather than stamped.

It is a further advantage of a method and system according to the present invention that a pickup box may be produced without the need for building conventional stamping dies. This results in a savings of time and capital expense.

It is yet another advantage of a method and system according to the present invention that secure storage space within a pickup box, such as for tools or other items, may be provided at minimal additional cost as compared with conventional pickup box construction.

Other advantages, as well as features and objects of the present invention, will become apparent to the reader of this specification.

DETAILED DESCRIPTION OF THE PREFERRED EMBODIMENTS

Figure 1:
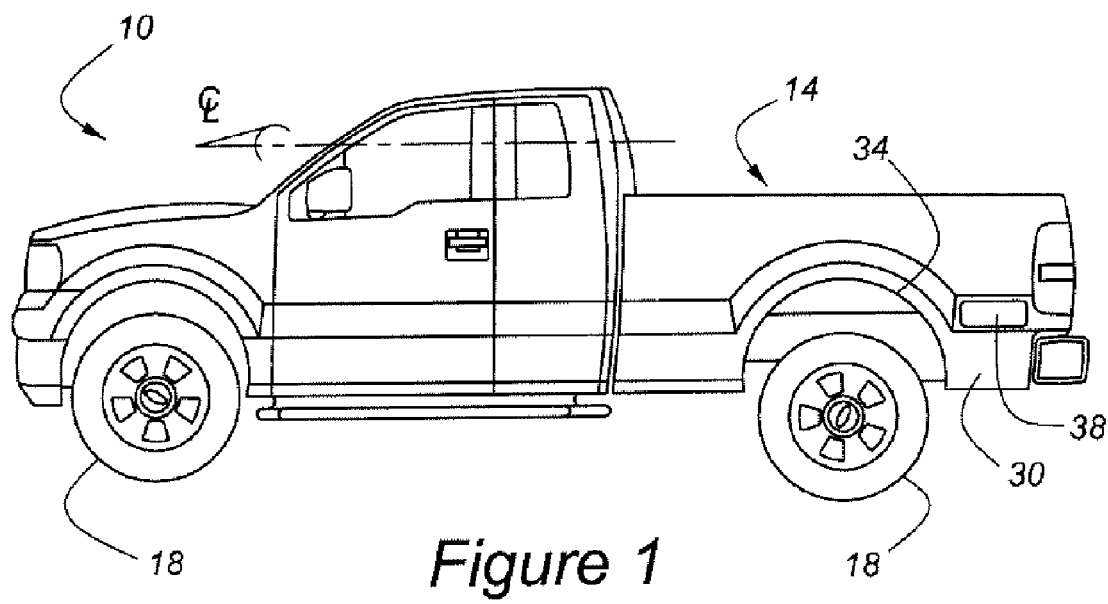
FIG. 1 is a side elevation of a vehicle having a bodyside according to the present invention.

As shown in FIG. 1, vehicle 10, which is in this case depicted as a pickup truck, has roadwheels 18, wheelhouse cutout 34 formed in outer panel 30, and cargo box 14. FIG. 1 also shows an exterior access door, 38, which allows access to a storage compartment contained within the wheelhouse structure of the vehicle.

Figure 2:
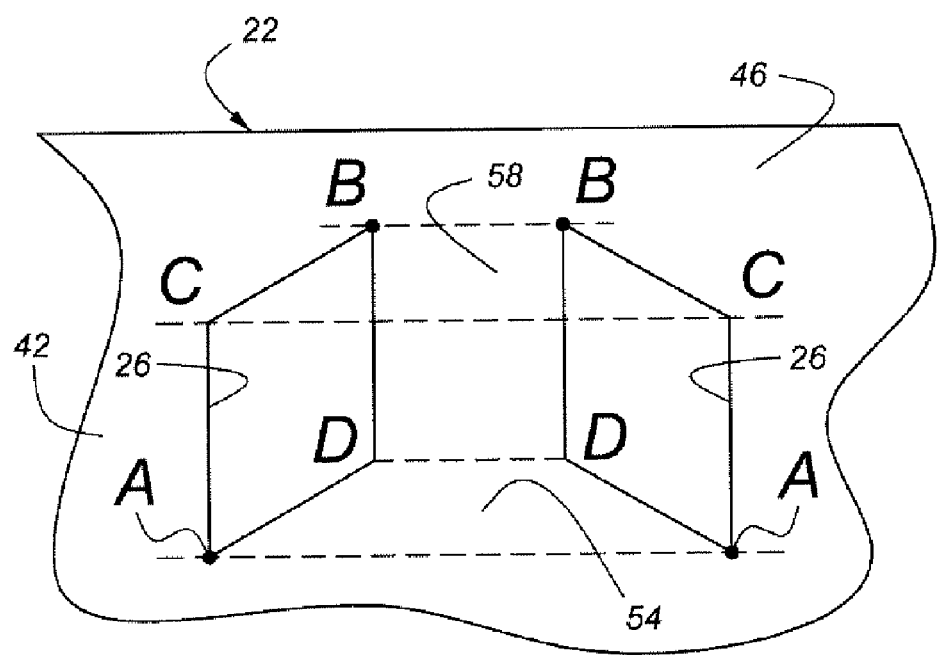
FIG. 2 shows a blank from which a bodyside will be formed by folding according to the present invention.

FIG. 2 shows blank 22, which has been prepared for folding into a bodyside structure according to the present invention. Those skilled in the art will appreciate in view of this disclosure that blank 22 could be formed from a sheet of metal, such as steel or aluminum, or from a sheet of plastics composite materials, or yet other foldable metallic or nonmetallic materials suggested by this disclosure.

Figure 3:
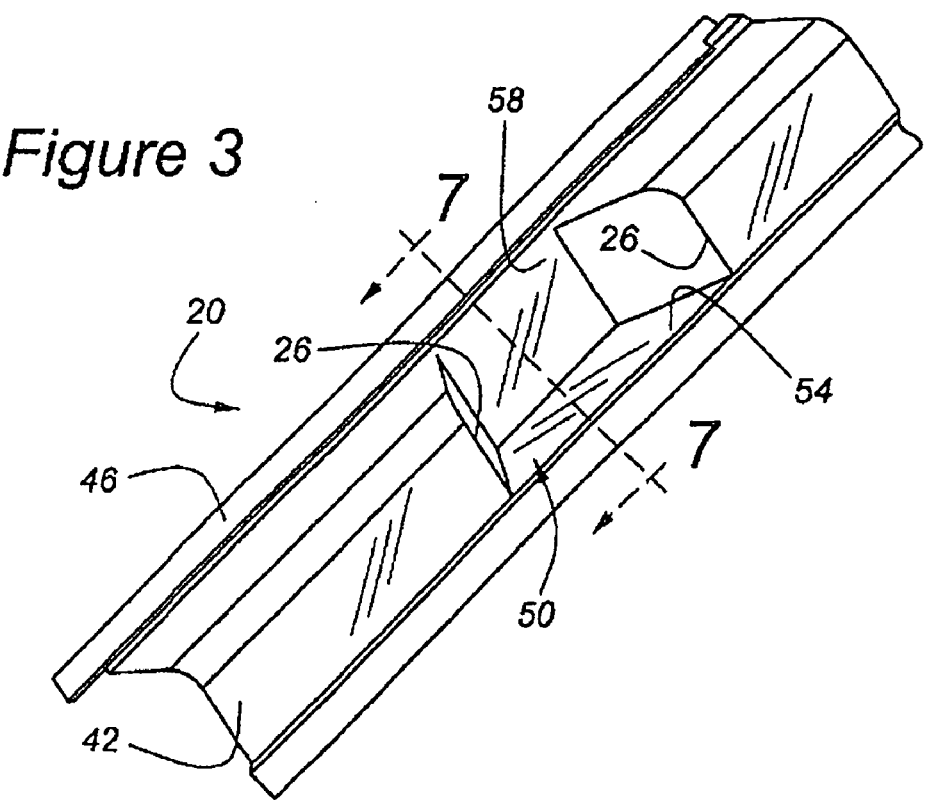
FIG. 3 is a perspective view of a bodyside which has been formed by folding according to the present invention.

Blank 22 has two apertures, 26, formed therein. Each of apertures 26 is a quadrilateral cutout having vertexes placed so as to allow the formation of a wheelhouse as the bodyside is folded. FIG. 2 shows four sets of fold axes defined by the vertexes of apertures 26. These fold axes are generally parallel to the longitudinal centerline, CL (FIG. 1), of a vehicle, such as a pickup truck, upon which a bodyside structure, such as the illustrated pickup box, may be mounted according to the present invention. Axis A—A, which is defined by the inboard vertexes of apertures 26, is a first fold line between inboard panel 54 of wheelhouse 50 and floor portion 42 of bodyside 20 (FIG. 3). Axis B—B, which is defined by the outboard vertexes of apertures 26, is a second fold line between upper panel 58 of wheelhouse 50, which is a generally horizontal panel, and side portion 46 of bodyside structure 20. Third fold line C—C, which is also defined by vertexes of apertures 26, demarcates a fold which separates side portion 46 of structure 20 from floor portion 42 of structure 20. Finally, axis D—D is located at the fold between inboard panel 54 of wheelhouse 50 and upper panel 58 of wheelhouse 50.

Figure 7:
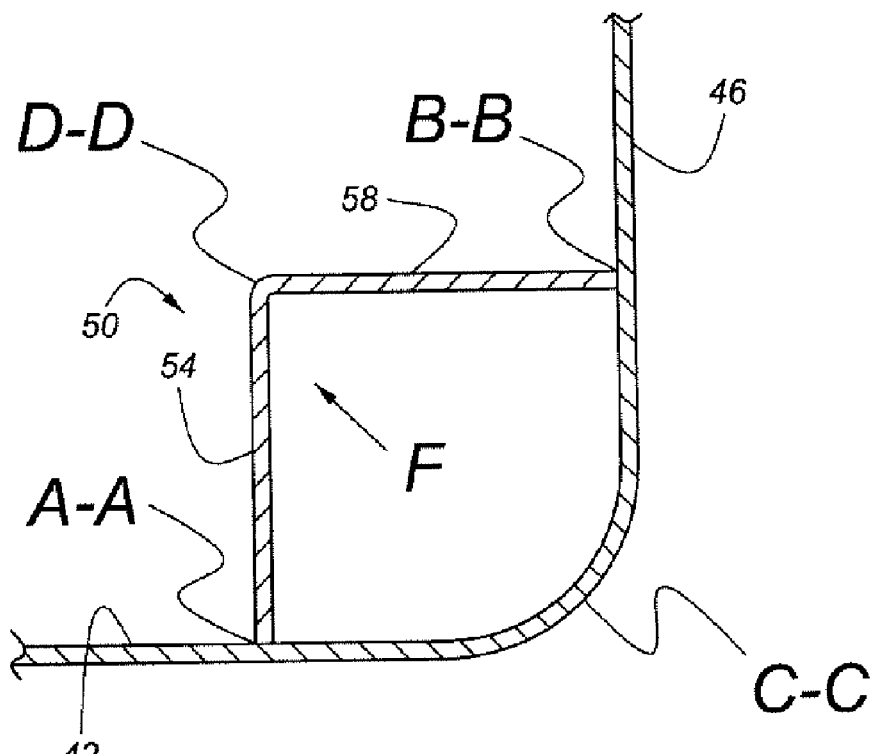
FIG. 7 is a sectional view of a bodyside, including wheelhouse 50, taken along the line of 7—7 FIG. 3.

FIG. 7 illustrates geometry produced by each of the fold lines A—A, B—B, C—C, and D—D. Force F is applied during the folding process by means of suitable fixtures (not shown) to produce the unique, integral structure of wheelhouse 50, including inside corner at axis D—D.

Once blank 22 has been folded, it has the appearance shown in FIG. 3. Thus, floor 42 and side portion 46 are at generally right angles to one another, and wheelhouse 50 has an inboard panel 54 and an upper panel 58. Apertures 26 have not been closed in FIG. 3; cover panel 62, shown in FIG. 4 may be employed for this purpose.

Figure 4:
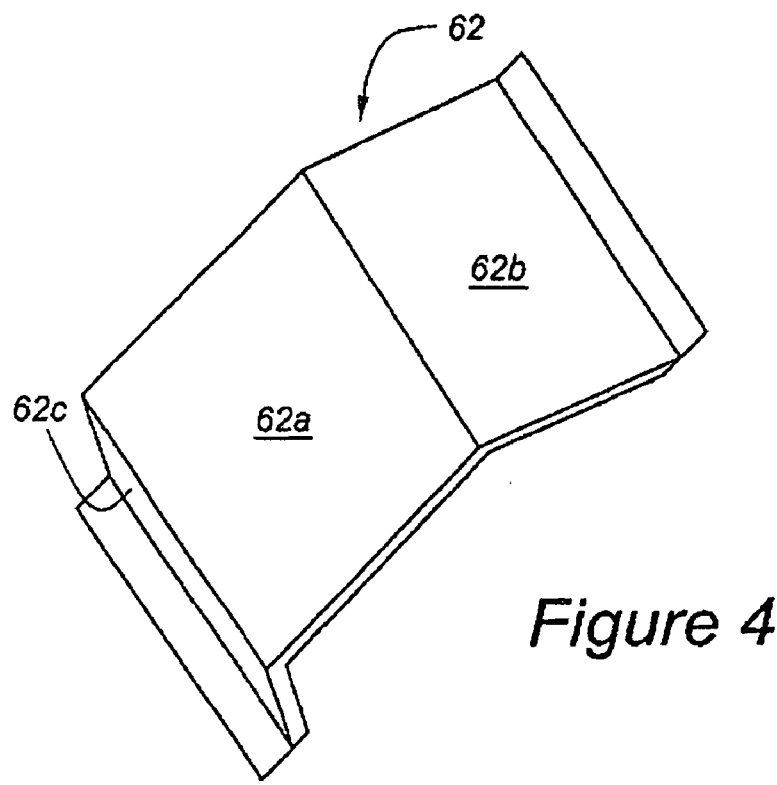
FIG. 4 illustrates one type of a closure structure suitable for enclosing end portions of a wheelhouse structure according to present invention.

As shown in FIG. 4, cover panel 62 has a mid portion, 62a which fits over upper panel 58 of wheelhouse 50. Portion 62b of cover panel 62 is a trailing section, which extends from the rearmost part of upper panel 58 to floor portion 42. Similarly, portion 62c of cover panel 62 is a leading section extending from the front of upper panel 58 to floor portion 42.

Figure 5:
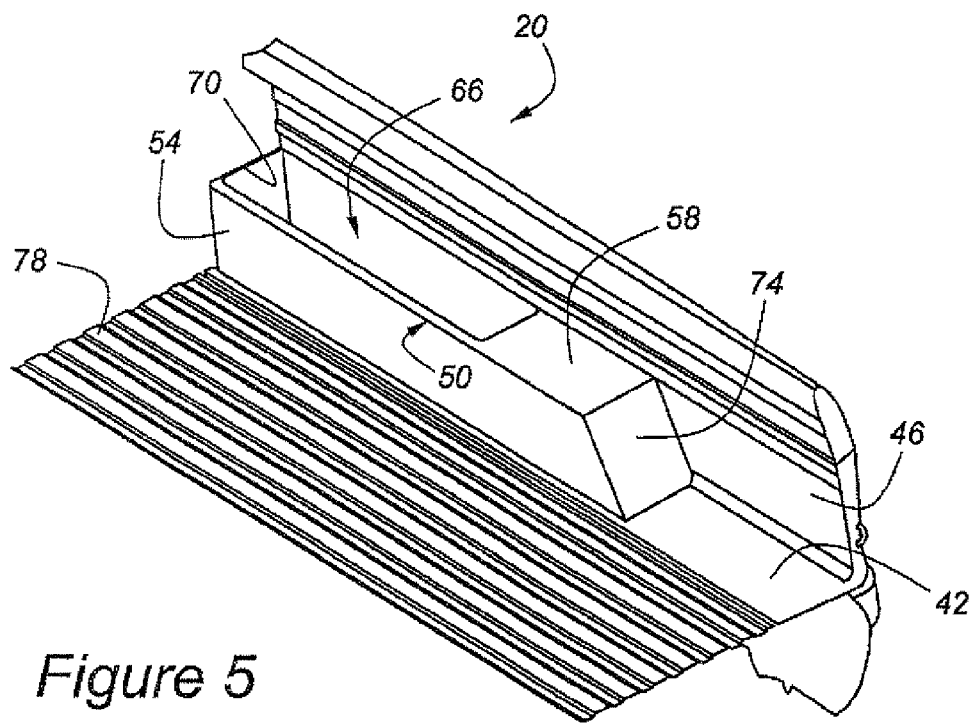
FIG. 5 is a perspective view of a wheelhouse structure according to the present invention having a storage container with an access door extending through the upper panel of the wheelhouse structure.

FIG. 5 illustrates an embodiment of the present invention in which cover panel 74, which is mounted to one side of wheelhouse 50, is the only cover panel needed because bodyside 20 includes storage container 66 as one of the closure structures extending within wheelhouse structure 50. Storage container 66 has an access opening, 70, formed in an upper portion of wheelhouse 50. Access opening 70 maybe closed by a door (not shown). Floor 78 extends under wheelhouse 50, except in the area of opening 34, (FIG. 1).

Figure 6:
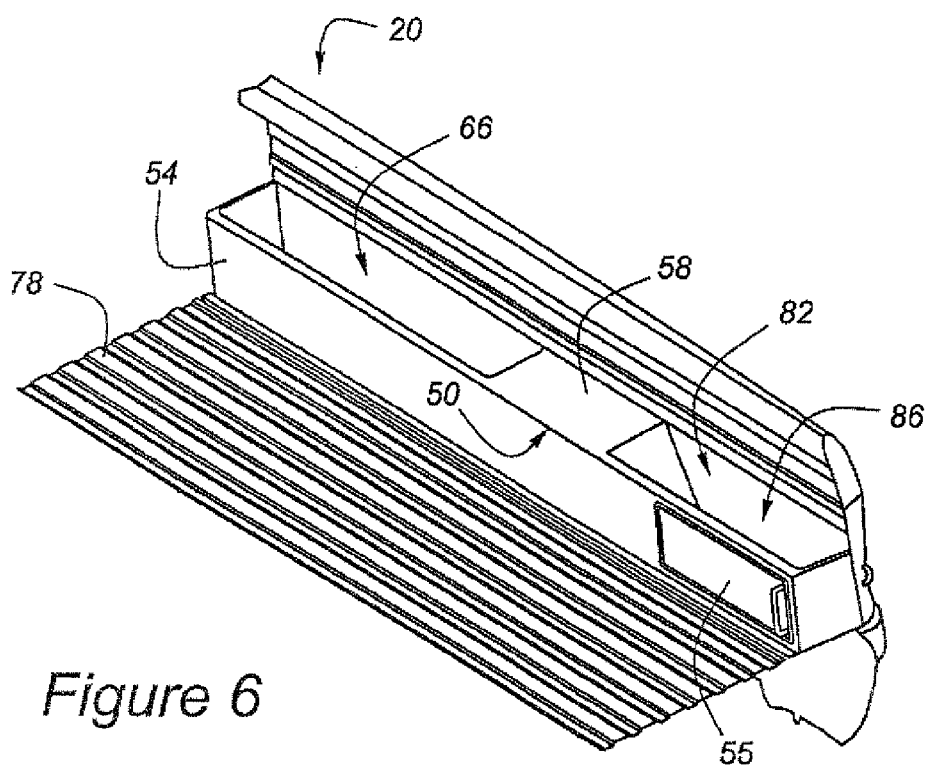
FIG. 6 illustrates a structure according to present invention having two storage compartments with two access doors extending through the upper panel of the wheelhouse structure.

FIG. 6 shows an embodiment in which two storage compartments, 66 and 82 are used. Compartment 66 is in a position leading the upper panel 58 of wheelhouse 50 and compartment 82 is in a position trailing upper panel 58 of wheelhouse 50. These storage compartments have upper access openings, 70 and 86, as well as door 55 extending through inboard panel 54. In this case, storage compartments 66 and 82 themselves function as closure structures extending within extended wheelhouse 50.

According to another aspect of the present invention, a method for forming a unitary bodyside for an automotive vehicle, includes the steps of preparing a blank by forming a plurality of cutouts within the blank, with the cutouts having inboard vertexes defining a first fold line extending between a floor portion and an inboard panel of a wheelhouse, and with the cutouts having outboard vertexes defining a second fold line extending between the side portion and an upper panel of the wheelhouse. The blank is folded on a third fold line extending parallel to and between the first and second fold lines, so as to define the floor portion and the side portion, while simultaneously forming the inner panel and upper panel of the wheelhouse by folding the blank at the first and second fold lines, as well as at a fourth fold line extending between the inner and upper panels of the wheelhouse.

Figure 8:
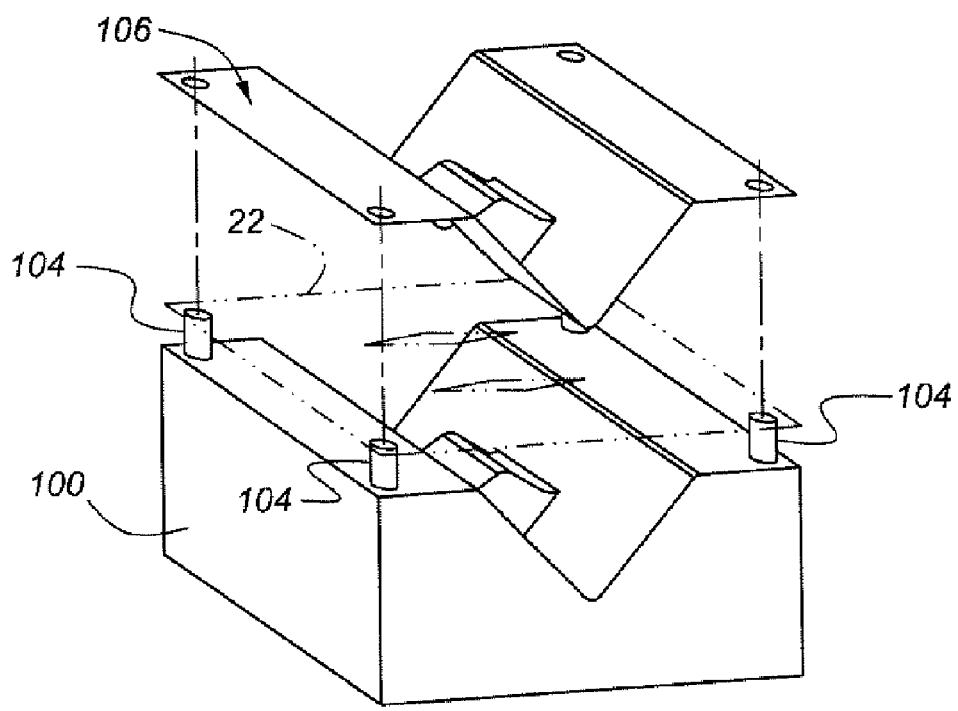
FIG. 8 is a perspective view of a bodyside forming apparatus according to one aspect of the present invention.

FIG. 8 illustrates a die set useful for folding a blank according to the present invention. Lower die 100 is depicted as a block or solid die, whereas upper die 106 is depicted as a sheet metal die. Those skilled in the art will appreciate in view of this disclosure that either die could be solid or formed from sheet metal. In any event, blank 22 is engaged with pins 104 of lower die 100 before upper die 106 is lowered to fold blank 22.

Although the present invention has been described in connection with particular embodiments thereof, it is to be understood that various modifications, alterations, and adaptations may be made by those skilled in the art without departing from the spirit and scope of the invention set forth in the following claims.

What is claimed is:

1. A pickup box for an automotive vehicle, comprising:
an outer panel having a wheelhouse cutout;
a bodyside joined to said outer panel and comprising a folded structure having a generally horizontal floor portion, a generally vertical side portion extending upwardly from and unitary with said floor portion, and a wheelhouse structure indexed with said wheelhouse cutout of the outer panel, with the wheelhouse structure being folded integrally from said floor portion and said side portion, and with said wheelhouse structure having an inboard panel extending upwardly from said floor portion, and an upper panel extending generally horizontally between an upper portion of said inboard panel and said generally vertical side portion.

2. A pickup box according to claim 1, further comprising a storage container extending within said wheelhouse structure, so as to form an end portion of said wheelhouse, and having an access door extending through the outer panel.

3. A pickup box according to claim 1, further comprising a storage container extending within said wheelhouse structure, so as to form an end portion of said wheelhouse, and having an access door extending through said inboard panel of said wheelhouse structure.

4. A pickup box according to claim 1, further comprising a storage container extending within said wheelhouse structure and having an access door extending through said upper panel of said wheelhouse structure.

5. A bodyside for an automotive vehicle, comprising:
a blank processed by folding along a plurality of axes to form a body structure comprising:
a generally horizontal floor portion;
a generally vertical side portion extending upwardly from and unitary with said floor portion; and
a wheelhouse structure formed integrally with said floor portion and said side portion by folding, with said wheelhouse structure having an inboard panel extending upwardly from said floor portion, and an upper panel extending generally horizontally between an upper portion of said inboard panel and said generally vertical side portion; and
at least one closure structure for enclosing an end portion of said wheelhouse structure, wherein said closure structure comprises a storage container extending within said wheelhouse structure.

6. A bodyside according to claim 5, wherein said closure structure comprises a cover panel applied to said wheelhouse structure and having a center section overlaying said upper panel, a leading section extending from the front of the upper panel to the floor portion, and a trailing section extending from the rearmost part upper panel to the floor portion.

7. A bodyside according to claim 5, wherein said closure structure comprises a first storage container extending within said wheelhouse structure in a position leading said upper panel, and a second storage container extending within the wheelhouse structure in a position trailing the upper panel.

8. A bodyside according to claim 5, wherein said closure structure comprises a first storage container extending within said wheelhouse structure in a position leading said upper panel, and a cover panel extending from a trailing end of said upper panel to the floor portion.

9. A bodyside according to claim 1, wherein said blank comprises sheet metal.

10. A bodyside according to claim 5, wherein said blank comprises a composite sheet.

* * * * *